United States Patent [19]
Hartle

[11] Patent Number: 6,021,965
[45] Date of Patent: Feb. 8, 2000

US006021965A

[54] APPARATUS FOR USE IN APPLYING ELECTROSTATICALLY CHARGED COATING MATERIAL

[75] Inventor: Ronald J. Hartle, Amherst, Ohio

[73] Assignee: Nordson Corporation, Westlake, Ohio

[21] Appl. No.: 09/212,762

[22] Filed: Dec. 16, 1998

Related U.S. Application Data

[63] Continuation of application No. 08/842,684, Apr. 15, 1997, abandoned.

[51] Int. Cl.$^7$ ...................................................... F16I 11/12
[52] U.S. Cl. ........................... 239/706; 239/526; 239/588; 138/120
[58] Field of Search ...................................... 239/526, 690, 239/588, 696, 704–708, 3; 138/103, 110, 126

[56] References Cited

U.S. PATENT DOCUMENTS

| | | | |
|---|---|---|---|
| 3,698,636 | 10/1972 | Szasz | 239/700 |
| 3,746,254 | 7/1973 | Duncan et al. | 239/690 |
| 3,794,243 | 2/1974 | Tamny et al. | 239/3 |
| 3,828,112 | 8/1974 | Johansen et al. | 174/47 |
| 3,940,065 | 2/1976 | Ware et al. | 239/146 |
| 3,960,323 | 6/1976 | Ducan et al. | 239/3 |
| 4,017,029 | 4/1977 | Walberg | 239/3 |
| 4,934,600 | 6/1990 | Lasley | 239/527 |
| 4,934,603 | 6/1990 | Lasley | 239/527 |
| 4,982,903 | 1/1991 | Jamison et al. | 239/690.1 |
| 5,271,569 | 12/1993 | Konieczynski et al. | 239/690 |
| 5,395,046 | 3/1995 | Knobbe et al. | 239/3 |
| 5,538,186 | 7/1996 | Konieczynski | 239/3 |
| 5,725,161 | 3/1998 | Hartle | 239/690 |

FOREIGN PATENT DOCUMENTS 0 409 461 A2  1/1991  European Pat. Off. .

OTHER PUBLICATIONS

Service Bulletin SB–2–220–A, *OMX*™ by DeVilbiss, ©Copyright 1995, DeVilbiss Industrial Spray Equipment (pp. 1, 8–11, 18, 19 and 24).
International Search Report of PCT/US98/06425 mailed Sep. 9, 1998.

*Primary Examiner*—Kevin Weldon
*Attorney, Agent, or Firm*—Wood, Herron & Evans, L.L.P.

[57] ABSTRACT

A flexible coating material conduit conducts a flow of electrostatically charged coating material to a spray gun. The flexible conduit includes a first or inner layer which is electrically insulating and chemically nonreactive with the electrostatically charged coating material. A second layer of synthetic rubber is electrically insulating. The second layer has a Shore A hardness of 75 or less and a thickness which is at least 0.200 times an overall radial extent of the conduit. A third layer of synthetic rubber extends around the second layer and is electrically conductive. A fourth layer of polymeric material extends around the third layer and is abrasion resistant and electrically insulating. The third layer is connected with ground. The source of electrostatically charged coating material includes a voltage block which electrically isolates the electrostatically charged coating material from a source of coating material which is not electrostatically charged.

62 Claims, 5 Drawing Sheets

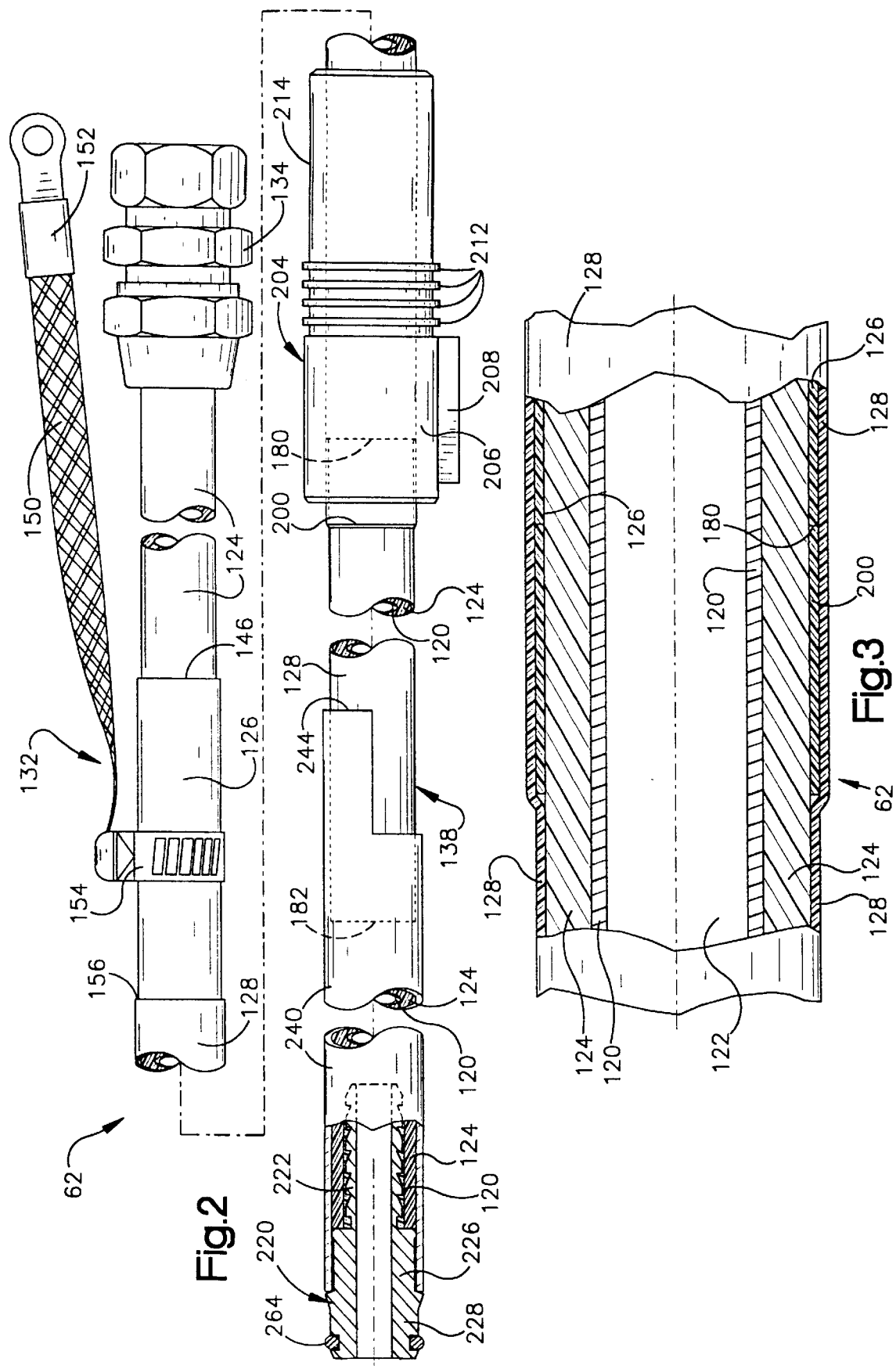

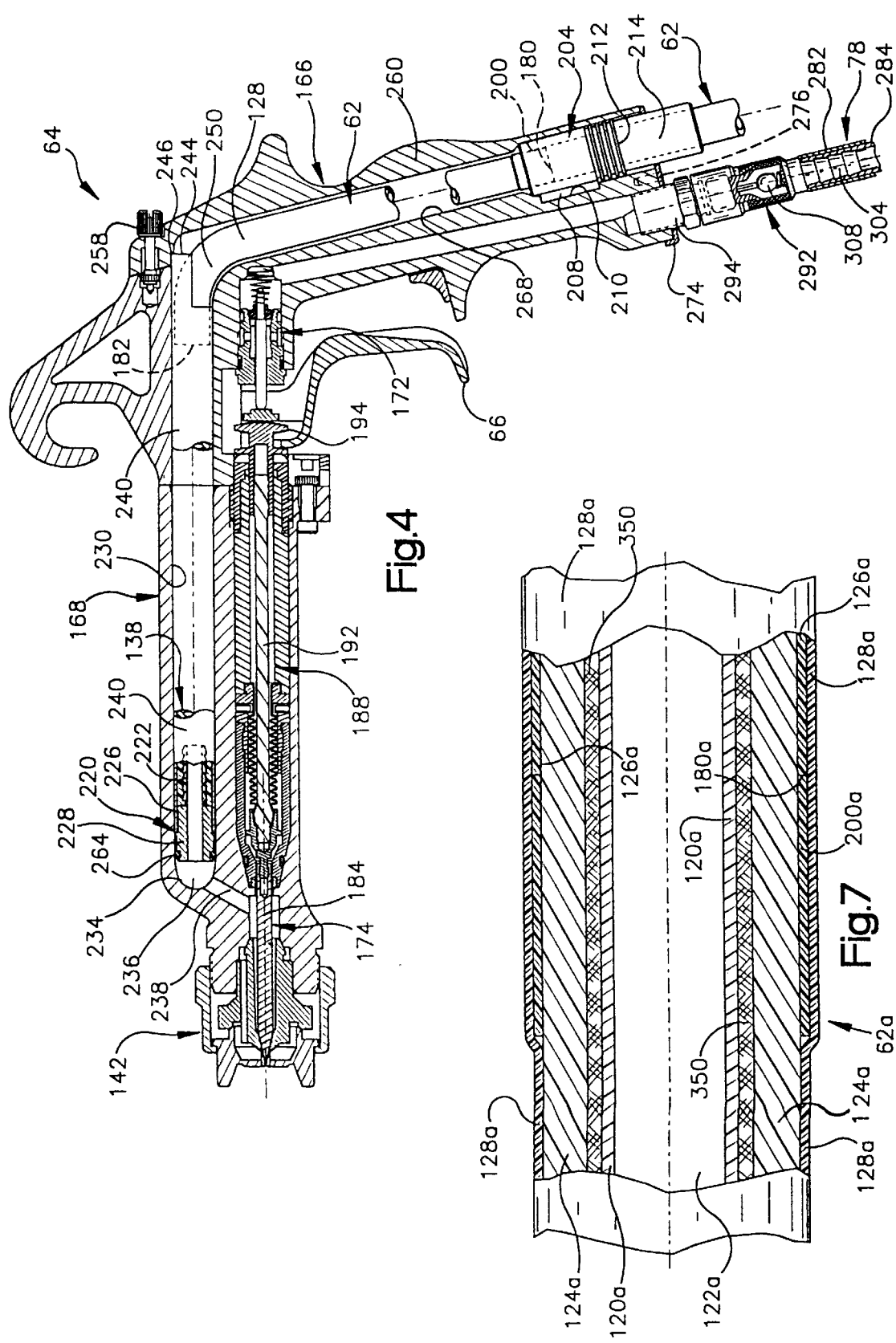

APPARATUS FOR USE IN APPLYING ELECTROSTATICALLY CHARGED COATING MATERIAL

The present application is a continuation of U.S. Ser. No. 08/842,684 filed Apr. 15, 1997, now abandoned.

BACKGROUND OF THE INVENTION

The present invention relates to a new and improved apparatus for use in applying electrostatically charged coating material to a workpiece.

Known apparatus for use in applying electrostatically charged coating material to a workpiece is disclosed in U.S. Pat. Nos. 3,746,254; 3,794,243; 5,271,569; and 5,538,186. With the apparatus disclosed in these patents, an operator utilizes a spray gun to apply the electrostatically charged coating material to a workpiece. Since the operator must hold the spray gun and move the spray gun relative to the workpiece, it is important that a hose which supplies coating material to the spray gun be relatively light and flexible. It is also important to minimize the weight of the spray gun.

SUMMARY OF THE INVENTION

The present invention relates to a new and improved apparatus for use in applying electrostatically charged coating material to a workpiece. The apparatus includes an improved coating material conduit which is flexible and conducts electrostatically charged coating material to a light weight spray gun. The coating material conduit may include a plurality of flexible layers.

A first or inner layer of the coating material conduit may be formed of a material which is electrically insulating and is chemically nonreactive with the electrostatically charged coating material. A second layer of elastomeric material, which may be synthetic rubber, is disposed around the first layer and is electrically insulating. A third layer of elastomeric material, which may also be synthetic rubber, extends around the second layer and contains electrically conductive material so that the third layer is electrically conductive. A fourth or outer layer extends around the third layer and is formed of material which is abrasion resistant.

To promote the flexibility of the coating material conduit, the second layer, which is electrically insulating, may have a Shore A hardness of 75 or less. The electrically insulating second layer may have a thickness which is at least 0.200 times an overall radial extent of the coating material conduit.

The coating material conduit may advantageously be connected with a voltage block. The voltage block is effective to isolate an apparatus which electrostatically charges the coating material from a source of coating material which is not electrostatically charged. The voltage block and the apparatus for electrostatically charging the coating material may be enclosed in an electrically grounded cabinet. The electrically conductive third layer of the coating material conduit may be connected with an electrical ground through the cabinet.

The coating material conduit may extend through an electrically conductive handle portion of the spray gun into an electrically insulating extension portion of the spray gun. An electrode in the extension portion of the spray gun may be electrostatically charged by the coating material. The electrically conductive handle portion of the spray gun may be connected with an electrical ground by a conductor which extends through a hose which conducts air to the spray gun.

BRIEF DESCRIPTION OF THE DRAWINGS

The foregoing and other features of the present invention will become more apparent upon a consideration of the following description taken in connection with the accompanying drawings wherein:

FIG. 2 is a plan view of an improved coating material conduit which is flexible and which conducts electrostatically charged coating material to a light weight spray gun in the apparatus of FIG. 1;

FIG. 3 is an enlarged fragmentary sectional view of a portion of the flexible coating material conduit of FIG. 2;

FIG. 4 is an enlarged sectional view illustrating the construction of the light weight spray gun used in the apparatus of FIG. 1 to apply coating material to the workpiece;

FIG. 7 is an enlarged fragmentary sectional view, similar to FIG. 3, of a second embodiment of the flexible coating material conduit.

DESCRIPTION OF ONE SPECIFIC PREFERRED EMBODIMENT OF THE INVENTION

General Description

Figure 1:
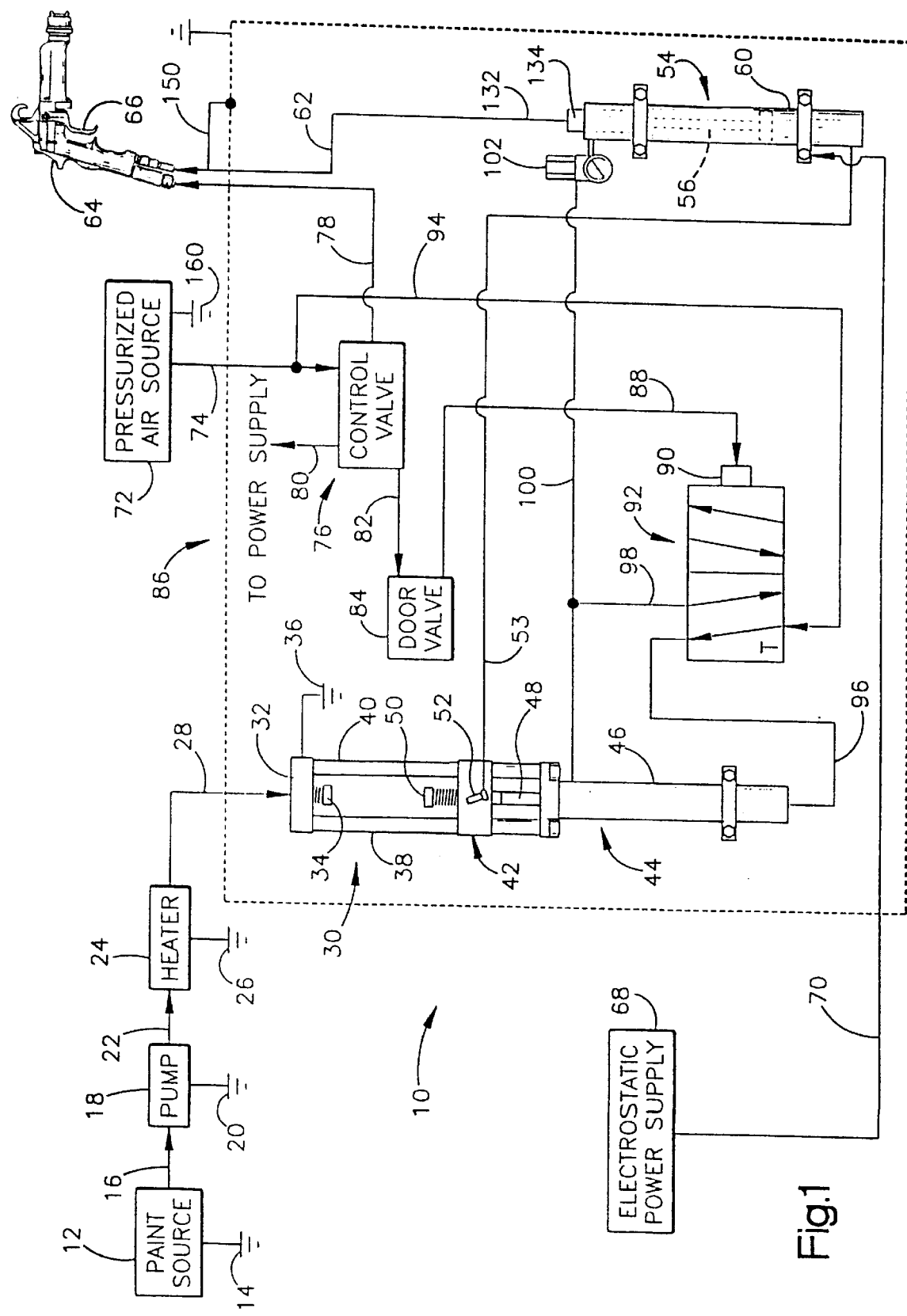
FIG. 1 is a schematic illustration of an apparatus for use in applying electrostatically charged coating material to a workpiece.

With reference to FIG. 1, an apparatus 10 for use in applying coating material to a workpiece includes a source of electrically conductive coating material, depicted as a water based paint source 12, which is grounded at 14 and connected by a line 16 to a pump 18 grounded at 20. The pump 18, in turn, is connected by a line 22 to a paint heater 24 which is grounded at 26. The paint heater 24 is optionally included in apparatus 10 for situations wherein the application characteristics of a coating material, such as paint, are optimized by dispensing the material at elevated temperatures. The paint heater 24 is incorporated within the apparatus 10 at a location which avoids loss of charge at the coating dispensers or spray guns, described below.

The paint is discharged from heater 24 through a line 28 into a voltage block mechanism 30 of the type fully disclosed in U.S. Pat. No. 5,197,676 to Konieczynski, et al., owned by the assignee of this invention, the disclosure of which is incorporated by reference in its entirety herein. For purposes of the present discussion, the voltage block 30 comprises a filling station 32 having a male coupling element 34 connected to line 28. The filling station 32 is grounded at 36. The filling station 32 mounts a pair of spaced rods 38 and 40 along which a shuttle 42 is axially slidable by operation of a pneumatic cylinder 44. The pneumatic cylinder 44 has a cylinder housing 46 mounted to one end of each of the rods 38, 40 and a cylinder rod 48 connected to the shuttle 42. In response to operation of pneumatic cylinder 44, the shuttle 42 is moved along the rods 38, 40 between a coupling or paint transfer position wherein a female coupling element 34, and a neutral, physically spaced positions herein the shuttle 42 is spaced from the filling station 32. Preferably, the male and female coupling elements 34, 50 are of the type disclosed in U.S. Pat. No. 5,078,168 to Konieczynski, et al., the disclosure of which, is incorporated by reference in its entirety herein.

The shuttle 42 has a fitting 52 which is connected by a paint transfer line 53 to the base of a piston pump 54. The piston pump 54 is a source of electrostatically charged coating material. The piston pump 54 is of the general type disclosed in the aforementioned U.S. Pat. No. 5,078,168, the details of which form no part of this invention and are therefore not discussed herein. As schematically depicted in FIG. 1, the piston pump 54 includes a piston 56 which is axially slidable within the housing 60 of the piston pump 54.

In response to movement of the piston 56 in a downward direction, as depicted in FIG. 1, coating material within the piston pump 54 is transferred through an improved hose or conduit 62 constructed in accordance with one of the features of the present invention. The coating material is, conducted to an improved spray gun 64 having an actuator or trigger 66. The spray gun 64 is similar to a spray gun disclosed in U.S. patent application Ser. No. 08/395,808 filed Feb. 28, 1995 by Ronald J. Hartle and entitled "Electrostatic Coating System Including Improved Spray Gun for Conductive Paints". The disclosure in the aforementioned U.S. patent application Ser. No. 08/395,808 filed Feb. 28, 1995 by Ronald J. Hartle is incorporated by this reference thereto in its entirety herein. Of course, other spray guns may be utilized if desired.

A high voltage electrostatic power supply 68, schematically depicted in FIG. 1, is connected by a high voltage line 70 to the housing 60 of piston pump 54. The details of the structure for interconnecting the power supply 68 with piston pump 54 form no part of this invention, and reference can be made to U.S. Pat. No. 5,197,676, mentioned above, for a detailed discussion of same.

Voltage Block

A pressurized air source 72, which is depicted schematically by a block in FIG. 1, is connected by an air supply line or conduit 74 to a control valve 76. The control valve 76 is connected by a line or conduit 78 to the spray gun 64, by a line 80 to the electrostatic power supply 68, and, by a line 82 to a door valve 84. The door valve 84 is schematically depicted by a block in FIG. 1 and is meant to refer to a valve associated with a door (not shown) of an electrically grounded cabinet 86. The cabinet 86 is illustrated in phantom in FIG. 1 and encloses the voltage block 30, control valve 76 and pump 54. The door valve 84 is effective to ground the system in the event the cabinet door is opened at any time.

A line 88 interconnects the door valve 84 with the pilot 90 of a pilot operated valve 92 depicted schematically in FIG. 1. Pressurized air is supplied to the pilot valve 92 through a line 94 connected to the air supply line 74 from air source 72 at a location upstream from control valve 76. In turn, the pilot valve 92 is connected by an air line 96 to the base of pneumatic cylinder 44 associated with shuttle 42. Additionally, a branch line 98 from pilot valve 92 is connected to a common line 100 extending between the top of pneumatic cylinder 44 and a pressure regulator 102 mounted to the piston pump 54.

In order to fill the piston pump 54 with paint in preparation for transmission to spray gun 64, pressurized air from source 72 is supplied through air supply line 74 and line 94 to the pilot valve 92. In the unpiloted position, pilot valve 92 allows a flow of air from line 94 to pass therethrough and enter line 96 which is connected to the bottom of pneumatic cylinder 44. In response to pressurization of the base of pneumatic cylinder 44, its piston 48 is extended to move shuttle 42 into position wherein the female coupling element 50 carried by shuttle 42 engages the male coupling element 34 at the filling station 32. With the male and female coupling elements 34, 560 engaged, paint is supplied from paint source 12 through lines 16, 22 and 28 to the filling station 32 where it enters the shuttle 42 through coupling elements 34, 50. The paint is transmitted from shuttle 42 through paint transfer line 53 to the base of piston pump 54 which fills its housing 60 causing the piston 56 to move axially upwardly therein. The piston pump 54 is quickly filled with paint, and the filing station 32 and shuttle 42 remain in engagement with one another until activation of spray gun 64 as described below.

Electrostatic charging of the coating material within piston pump 54, and its transmission to the spray gun 64, is initiated by actuating the spray gun 64, i.e., depressing its trigger 66. When the gun trigger 66 is depressed, pressurized air is exhausted from line 78 interconnecting the control valve 76 with spray gun 64. This creates a pressure drop within control valve 76 allowing pressurized air from line 74 connected to flow into line 78, and then to the spray gun 64. The pressurized air discharged through line 78 functions to atomize the coating material discharged from the improved spray gun 64. The general construction and mode of operation of the apparatus 10 is the same as is disclosed in U.S. Pat. No. 5,538,186 issued Jul. 23, 1996 to Ronald D. Konieczynski and entitled "Apparatus and Method for Dispensing Electrically Conductive Coating Material Including a Pneumatic/Mechanical Control". The disclosure in the aforementioned U.S. Pat. No. 5,538,186 is incorporated herein in its entirety by this reference thereto.

Coating Material Conduit

In accordance with one of the features of the present invention, the coating material conduit 62 (FIGS. 2 and 3) is flexible so that an operator can easily move the spray gun 64 (FIG. 4) relative to a workpiece to which the coating material is being applied. By increasing the flexibility of the coating material conduit 62 (FIG. 2), the present invention reduces operator fatigue.

The flexible coating material conduit 62 includes a tubular cylindrical inner or first layer 120 (FIG. 3) which defines a passage 122 through which a flow of electrostatically charged coating material is conducted to the spray gun 64. The inner layer 120 of the conduit 62 is formed of a material which is electrically insulating and chemically nonreactive with the electrostatically charged coating material. Although the inner layer 120 could be formed of many different materials, it is preferred to form the inner layer of a polymeric material. In one embodiment of the invention, the inner layer 120 was formed of high density polyethylene. However, if desired, the inner layer 120 could be formed of nylon or Teflon or any desired polyolefin.

A second layer 124 (FIG. 3) has a tubular cylindrical configuration and extends around the inner layer 120. The second layer 124 is formed of an electrically insulating material which has a greater flexibility than the inner layer 120. To provide the desired flexibility, the second, layer 124 is formed of an elastomeric material. In the embodiment of the invention illustrated in FIG. 3, the second layer 124 is formed of a synthetic rubber which is commercially available from RTP Company of Winona, Minn. under the designation GLS-DYNAFLEX 7410.

The elastomeric material of the second layer 124 is capable of being easily flexed, that is, bent from the linear configuration illustrated in FIG. 3, to accommodate movement of the spray gun 64 (FIGS. 1 and 4) relative to a workpiece. In the illustrated embodiment of the invention, the elastomeric material of the second layer 124 is extruded directly over and adheres to the inner layer 120. However, if desired, one or more layers of material could be provided between the inner layer 120 and the second layer 124.

A tubular cylindrical third layer 126 extends around the second layer 124. The third layer 126 is electrically conductive. In order to promote the flexibility of the coating material conduit 62, the third layer 126 is formed of a flexible elastomeric material which is electrically conductive. In the illustrated embodiment of the coating material conduit 62, the third layer 126 is formed of synthetic rubber which contains conductive material. In this specific embodiment of the invention, the conductive material in the third layer 126 of synthetic rubber is carbon. One commercially available electrically conductive material which may be used as the third layer 126 is RTP Conductive GLS-DYDNAFLEX 2799X 66450 which is sold by RTP Company of Winona, Minn.

It should be understood that the third layer 126 could be formed of flexible material other than synthetic rubber and could contain electrically conductive materials other than carbon. For example, the third layer 126 could be formed of natural rubber containing particles of metal. Although it is preferred to extrude the elastomeric material of the third layer 126 directly over and adhere the third layer to the second layer 124, one or more layers of material could be provided between the second and third layers 124 and 126 if desired.

A tubular cylindrical fourth or outer layer 128 extends around the third layer 126. The outer layer 128 is formed of an abrasion-resistant material. In addition, the outer layer is electrically insulating. In the specific embodiment of the invention illustrated in FIG. 3, the outer layer is formed of black polyurethane. Of course, the outer layer 128 could be formed of a different material if desired. Although it is preferred to extrude the polymeric material of the outer layer 128 directly over the third layer 126, one or more layers of material could be provided between the third layer 126 and the outer layer 128 if desired.

The flexibility of the coating material conduit 62 is enhanced by forming the electrically insulating second layer 124 and the electrically conductive third layer 126 of relatively soft materials which can be easily flexed. thus, the second layer 124 and third layer 126 are formed of elastomers having a Shore A hardness No. of 75 or less. It is believed that it may be preferred to form the electrically insulating second layer 124 of an elastomer having a Shore A hardness No. of 45 to 70. In the specific embodiment illustrated in FIG. 3, the second layer 124 and the third layer 126 had a Shore A hardness No. of 68.

Of course, the second and third layers 124 and 126 could be formed of materials having many different Shore hardness numbers. However, it is believed that it will be preferred to have a relatively low Shore hardness number for the second layer 124 and third layer 126 in order to promote the flexibility of the coating material conduit 62. For example, it is contemplated that the second layer 124 may have a Shore A hardness No. of 45 to 50 while the third layer 126 has a somewhat larger Shore A hardness number.

In one specific embodiment of the invention, the coating material conduit 62 had a diameter of slightly more than one half of an inch, specifically 0.510 to 0.540 inches. In this particular embodiment of the invention, the inner layer 120 had an inside diameter of 0.250 inches and a radial wall thickness of 0.030 inches. The electrically insulating second layer 124 had an outside diameter of 0.480 to 0.470 inches and a radial wall thickness of 0.085 to 0.080 inches. The electrically conductive third layer 126 had a radial wall thickness of 0.010 to 0.015 inches. The abrasion resistant outer layer 128 had a radial wall thickness of 0.010 to 0.015 inches.

In this specific embodiment of the invention, the relatively soft electrically insulating second layer 124 had a radial wall thickness of 0.080 to 0.085 inches. The radial wall thickness of the relatively soft electrically insulating second layer 124 is greater than the combined radial wall thicknesses of the inner layer 120, the electrically conductive third layer 126 and the outer layer 128. This promotes the flexibility of the coating material conduit 62.

The coating material conduit 62 is relatively flexible. This is due, in part at least, to the relatively low hardness of the electrically insulating second layer 124 and the relatively large radial extent of the electrically insulating second layer. The ratio of the radial extent of the electrically insulating second layer 124 to the overall radial extent of a coating material conduit 62 having the dimensions previously set forth herein is between 0.296 and 0.333. It is believed that the electrically insulating second layer 124 should have a Shore A hardness No. of 75 or less. The ratio of the radial thickness of the electrically insulating second layer 124 to the overall radial extent of the coating material conduit 62 should be 0.200 or more.

For example, the specific coating material conduit 62 illustrated in FIGS. 2 and 3 has an outer or fourth layer 128 (FIG. 3) with an outside diameter of 0.510 to 0.540 inches or a radial extent of 0.255 to 0.270 inches. The electrically insulating second layer 124 has an inside diameter of 0.310 inches and an outside diameter of 0.470 to 0.480 inches. Therefore, the electrically insulating second layer 124 has a thickness or radial extent of 0.080 to 0.085 inches. This results in the coating material conduit 62 having a ratio of the radial thickness of the electrically insulating second layer 124 to the overall radial extent of the coating material conduit of between 0.085/0.255 to 0.080/0.270 or 0.333 to 0.296.

It should be understood that the foregoing specific dimensions and hardnesses for the layers 120, 124, 126 and 128 of the coating material conduit 62 have been set forth herein for purposes of clarity of description. It is contemplated that the layers 120, 124, 126 and 128 could have different dimensions and/or hardnesses than the ones previously set forth herein. The ratio of the radial thickness of the electrically insulating second layer 124 to the radial extent of the coating material conduit 62 could be different than the specific ratios previously set forth. It is also contemplated that the coating material conduit 62 could have a greater or lesser number of layers if desired.

In the illustrated embodiment of the invention, the coating material conduit 62 has an inlet end portion 132 (FIG. 2) which includes a coupling 134. The coupling 134 is connected with the piston pump 54 (FIGS. 1 and 5) and the inner layer 120 of the coating material conduit 62. Therefore, electrostatically charged coating material flows from the piston pump 54 through the coupling 134 into the passage 122 (FIG. 3) in the conduit 62.

An outlet end portion 138 of the coating material conduit 62 is received in the spray gun 64 (FIG. 4). The inner layer 120 of the coating material conduit 62 extends through the outlet end portion 138 of the coating material conduit. Therefore, electrostatically charged coating material is conducted from the piston pump 54 through the coating material conduit 62. The electrostatically charged coating material flows from the outlet end portion 138 of the coating material conduit 62 to a nozzle 142 in the spray gun 64. The electrostatically charged coating material is conducted from the nozzle 142 of the spray gun 64 toward the workpiece (not shown).

The coupling 134 (FIG. 2) is formed of an electrically conductive material, that is, metal. Therefore, the coupling 134 becomes electrostatically charged by the flow of electrostatic coating material from the piston pump 54 (FIGS. 1 and 5) through the coupling 134 into the conduit 62. To prevent a loss of the electrostatic charge on the coating material conducted from the piston pump 54 to the coating material conduit 62, the electrically conductive third layer 126 (FIG. 3) has an end 146 (FIG. 2) which is spaced from the coupling 134 (FIG. 5).

Figure 5:
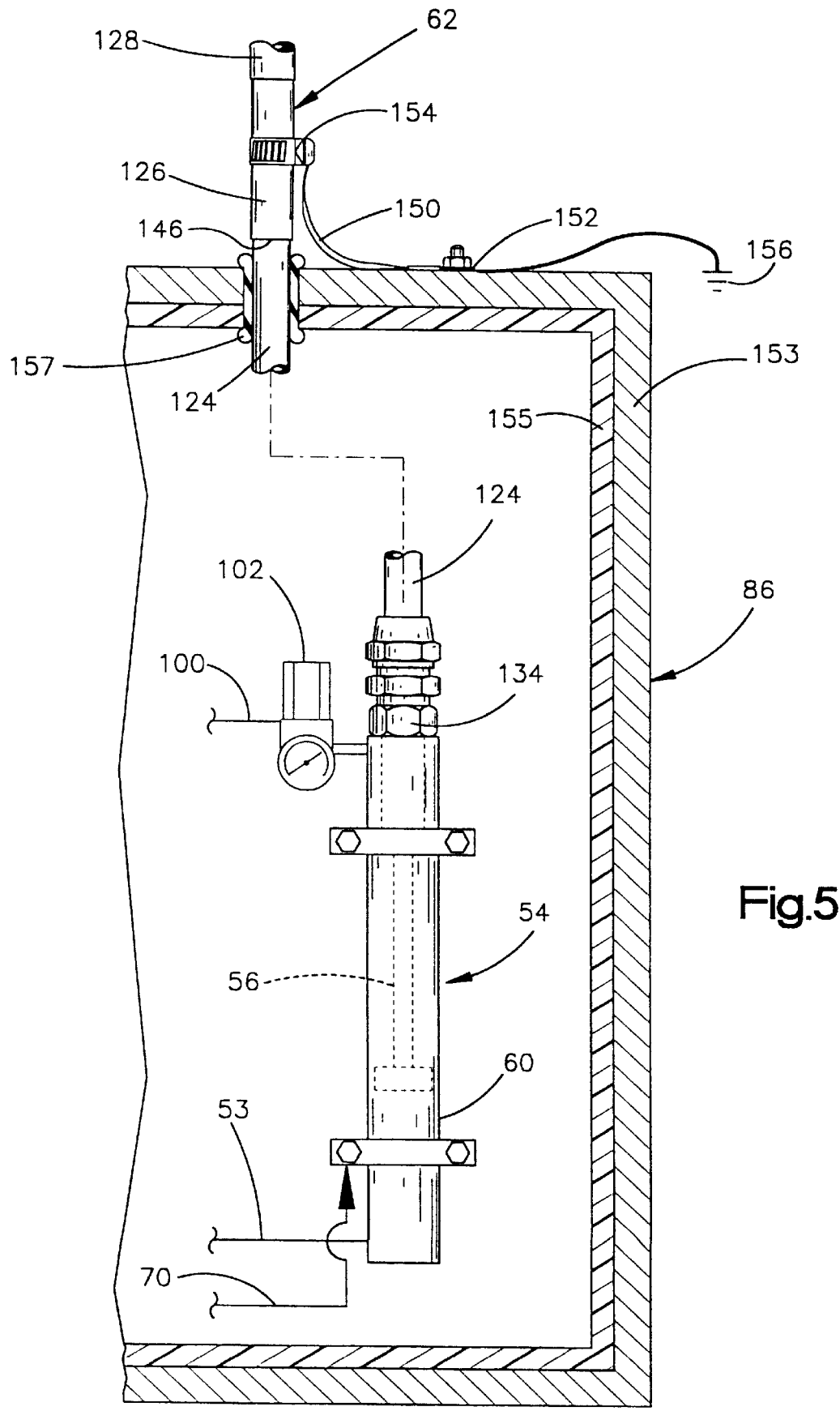
FIG. 5 is a schematic illustration of the manner in which the coating material conduit of FIG. 2 is connected with the apparatus of FIG. 1.

The end 146 (FIG. 2) of the electrically conductive third layer 126 is disposed outside of the electrically grounded cabinet 86 (FIG. 5). Thus, there may be a substantial distance, for example 24 inches, between the end 146 of the electrically conductive layer 126 and the coupling 134. This enables the electrically conductive layer 126 to be disposed outside of the cabinet 86 which encloses the source of electrostatically charged coating material, that is the piston pump 54, and the voltage block 30.

The third, electrically conductive, layer 126 is connected with an electrical ground. Therefore, the electrically conductive third layer 126 is effective to ground any leakage of the electrostatically charged coating material as a result of abuse or other inappropriate use of the coating material conduit 62. The third layer 126 is advantageously connected with an electrical ground through the cabinet 86.

An electrically conductive metal ground strap 150 (FIG. 2) has a metal end portion 152 which is fixedly connected to the cabinet 86 (FIGS. 1 and 5). The cabinet 86 includes a metal outer layer 153 (FIG. 5) which is electrically conductive and a polymeric inner layer 155 which is electrically insulating. The ground strap 150 is connected with an electrical ground 156 through the metal outer layer 153 of the cabinet 86. An electrically conductive, metal base clamp 154 connects the metal ground strap 150 with the electrically conductive third layer 126. The end 146 of the electrically conductive third layer 126 (FIG. 2) is disposed outside of the cabinet 86.

The portion of the coating material conduit 62 which extends into the cabinet 86 includes only the second layer 124 of electrically insulating material and the inner layer 120 of electrically insulating material. An electrically insulating grommet 157 (FIG. 5) protects the second layer 124 of electrically insulating material. The metal coupling 134 is disposed in the cabinet 86 (FIGS. 1 and 5) and is connected with the piston pump 54. Of course, the electrically conductive third layer 126 could extend into the cabinet 86 if desired. However, the electrically conductive third layer 126 is spaced from the metal coupling 134. It should be understood that the electrically conductive third layer 126 could be connected with an electrical ground in a manner other than through the cabinet 86 if desired.

The majority of the length of the coating material conduit 62 extends between the spray gun 64 and an end 156 (FIG. 2) of the abrasion-resistant outer layer 128 disposed adjacent to the ground strap 150. Although this distance has been illustrated schematically as being relatively small in FIG. 1, it should be understood that the coating material conduit 62 could have any desired length. Thus, the length of the coating material conduit 62 will depend, in part, on the distance between the cabinet 86 in which the source 54 of electrostatically charged coating material is disposed and a location where the spray gun 64 is held by an operator during the application of electrostatically charged coating material to a workpiece.

Spray Gun

The spray gun 64 (FIG. 4) is light weight. This light weight is due, in part at least, to the fact that the coating material is electrostatically charged at the source, that is, at the piston pump 54 of FIG. 1, rather than by electrical components in the spray gun 64. The light weight of the spray gun 64 is also promoted by forming the spray gun of light weight polymeric materials. The light weight of the spray gun, when combined with the relatively high flexibility of the coating material conduit 62 (FIG. 2), reduces operator fatigue during the application of coating material to a workpiece.

The electrostatically charged coating material is preferably a water-based liquid coating material which may be either clear or opaque when applied to a workpiece. This type of coating material is electrically conductive. Since the coating material is electrically conductive, once it is charged at the source or piston pump 54 (FIG. 1) that charge will flow along the column of coating material in the conduit 62 and through the coating material in the spray gun 64 so that the coating material is electrically charged when it is sprayed from the gun. For this reason, the need for housing electrical charging components within the spray gun 64 is eliminated, together with the need for connecting a high voltage cable or electric wire to the spray gun.

The source 72 (FIG. 1) of air is connected with the spray gun 64 through air conduits 74 and 78. The air conduits 74 and 78 have the same construction. The air conduit 74 is connected with an electrical ground 160 adjacent to the pressurized air source 72. The air conduit 78 is connected with the electrical ground 160 through the control valve 76 and the air conduit 74. The construction of the air conduits 74 and 78 and the manner in which they are connected with the electrical ground 160 will be subsequently described more fully herein.

The spray gun 64 includes an electrically conductive handle portion 166 (FIG. 4) which is grounded by the air conduit 78, as will be later described. An electrically nonconducting extension or barrel portion 168 is fixedly connected to and extends outward from the handle portion 166. The nozzle 142 is supported on an outer end of the extension portion 168. The nozzle 142 directs a spray of electrostatically charged liquid coating material toward the workpiece. The nozzle 142 is effective to atomize the spray and to give the atomized spray a desired configuration or pattern in the manner disclosed in U.S. Pat. No. 4,544,100 issued Oct. 1, 1985 and entitled "Liquid Spray Gun Having Quick Change Pattern Control" which is hereby incorporated by reference in its entirety.

A trigger 66 is pivotally mounted on the handle portion 166 of the spray gun. Pivotal movement of the trigger 66 controls actuation of a main air flow control valve 172 and a coating material flow control valve assembly 174 (FIG. 4). The trigger 66 is formed of the same electrically conductive material as the handle portion 166 of the spray gun 64.

In accordance with one of the features of the present invention, the coating material conduit 62 extends through the handle portion 166 into the extension portion 168 of the spray gun 64. The electrically conductive third layer 126 (FIG. 3) of the coating material conduit 62 has an end 180 (FIGS. 2 and 4) which is disposed in the handle portion 166 of the spray gun 64. The outer layer 128 has an end 182 (FIGS. 2 and 4) which is disposed in the handle portion 166 of the spray gun 64.

Only the inner layer 120 and electrically insulating second layer 124 of the coating material conduit 62 extend into the extension or barrel portion 168 (FIG. 4) of the spray gun 64. The electrically conductive third layer 126 of the coating material conduit 62 terminates in the electrically conductive handle portion 166 of the spray gun 64. Therefore, the electrically conductive third layer 126 is isolated from the electrostatically charged coating material conducted through the passage 122 in the coating material conduit 62. If desired, a thin layer of dielectric grease may be applied to the outer side surface of the outer layer 128 of the coating material conduit 62 to form a seal with surfaces of the spray gun 64.

Air flow control valves may be provided in the electrically conductive handle portion 166 of the spray gun 64. The general construction of the spray gun 64 is the same as is disclosed in co-pending application Ser. No. 08/395,808 filed Feb. 28, 1995 by Ronald J. Hartle and entitled "Electrostatic Coating System Including Improved Spray Gun For Conductive Paints". The disclosure in the aforementioned co-pending application Ser. No. 08/359,808 is hereby incorporated herein in its entirety by this reference thereto.

Force is transmitted between a needle valve 184 (FIG. 4) and the trigger 66 through a cartridge assembly 188. This force effects movement of the needle valve between the closed position shown in FIG. 4 and a range of open positions. The cartridge assembly 188 biases the needle valve 184 toward the closed position shown in FIG. 4. The cartridge assembly 188 also provides a seal between the axially movable needle valve 184 and the stationary extension portion 168 of the spray gun 64. A layer of dielectric grease is provided between an outer surface of the cartridge assembly 188 and the extension or barrel portion 168 of the spray gun 64.

The needle valve 184 is electrically conducting. Thus, the needle valve 184 is formed of stainless steel. The needle valve 184 is connected with an electrically insulating actuator rod 192 in the cartridge assembly 188.

The actuator rod 192 (FIG. 4) has an end portion which is connected with an electrically insulating puller 194. The puller 194 engages the trigger 66. Therefore, pivotal movement of the trigger 66 toward the handle portion 166 moves the puller 194, actuator rod 192 and needle valve 184 toward the right (as viewed in FIG. 4) to open a coating material flow passage in the nozzle 142. The actuator rod 192 and puller 194 are formed of an electrically nonconducting material, specifically acetyl resin sold under the trademark DELRIN.

The stainless steel needle valve 184 is charged by a flow of electrostatically charged coating material around the needle valve 184. Since the needle valve 184 is electrostatically charged by the coating material, a charging apparatus does not have to be provided in the extension portion 168 of the spray gun 64. This contributes to the goal of minimizing the weight of the spray gun 64.

Once the needle valve 184 (FIG. 4) has become charged, a pointed front end of the needle valve strengthens the electrostatic field which is present between the front of the spray gun 64 and the grounded workpiece being painted. By strengthening the electrostatic field, the electrostatically charged coating material is more strongly attracted to the workpiece. Thus, the needle valve 184 becomes a field electrode for the spray gun 64 even though the spray gun has no charging electrode in the conventional sense. The construction of the cartridge assembly 188 and the manner in which it cooperates with the needle valve 184 is the same as is disclosed aforementioned U.S. Pat. application Ser. No. 08/395,808 filed Feb. 28, 1995 by Ronald J. Hartle and incorporated herein by this reference and the previous reference thereto.

As was previously mentioned, the end 180 of the third layer 126 of electrically conductive material is disposed in the handle portion 166 (FIG. 4) of the spray gun 64. A cylindrical tubular sleeve 200 (FIGS. 3 and 4) of electrically insulating material is disposed in abutting engagement with the end 180 of the electrically conductive third layer 126. The sleeve 200 extends axially away from the third layer 126 of electrically conductive material to reinforce the portion of the coating material conduit 62 adjacent to where the third layer 126 ends.

In addition, the sleeve 200 provide a sealed interconnection with the outer layer 128 of abrasion-resistant material and the second layer 124 of electrically insulating material. Thus, the outer layer 128 of abrasion-resistant material extends past the end 180 (FIG. 3) of the third layer 126 of electrically conductive material. The outer layer 128 extends along and sealingly engages the outer side of the sleeve 200. The outer layer 128 extends into sealing engagement with the second layer 124 of electrically insulating material.

The sleeve 200 is disposed adjacent to a stress relief structure 204 (FIG. 2) which interconnects the handle portion 166 of the spray gun 64 and the coating material conduit 62 (FIG. 4). The stress relief structure 204 includes a cylindrical main section 206 having a rectangular key 208 which engages a correspondingly shaped slot 210 in the handle portion 166 of the spray gun 64 (FIG. 4).

A plurality of annular ribs 212 (FIG. 2) are provided adjacent to the main section 206 of the stress relief structure 204. A cylindrical body section 214 extends outward from the main section 206 and ribs 212. The body section 214 extends outward from the handle portion 166 (FIG. 4) and reinforces the coating material conduit 62 adjacent to the handle portion in a known manner.

A barbed fitting 220 (FIGS. 2 and 4) is provided in the end portion 138 of the coating material conduit 62. The barbed fitting 220 (FIG. 2) has a generally cylindrical tubular shank portion 222. Annular ribs or barbs disposed on the shank portion 222 grip the inner layer 120 of the coating material conduit 62. Thus, the shank portion 222 of the barb fitting 220 is forced axially into the passage 122 (FIG. 3) in the inner layer 120 of the coating material conduit. The barbed fitting 220 (FIG. 2) forms a fluid tight seal with the inner layer 120 of the coating material conduit.

The barb fitting 220 has a head end portion 228 which sealingly engages an inner side surface of a generally cylindrical passage 230 (FIG. 4) formed in the extension or barrel portion 168 of the spray gun 64. The head end portion 228 of the barbed fitting 220 cooperates with an arcuate end surface 234 of the passage 230 in the extension portion 168 of the spray gun 64 to form a chamber 236. The chamber 236 is connected with a cylindrical passage 238 leading to the nozzle 142.

The barbed fitting 220 is formed of an electrically insulating polymeric material. In one specific embodiment of the coating material conduit 62, the barbed fitting 220 was formed of polyether etherketone (PEEK). Of course, the barbed fitting 220 could be formed of other materials if desired.

Electrostatically charged coating material flows through the coating material conduit 62 and the barbed fitting 220 into the chamber 236. The electrostatically charged coating material flows from the chamber 236 through the passage 238 to the nozzle 142. Operation of the trigger 66 moves the needle valve 184 towards the right (as viewed in FIG. 4) from the closed position to the open position to enable a flow of coating material to be directed from the nozzle 142 toward a workpiece.

The fluid pressure in the chamber 236 urges the barbed fitting 220 toward the right (as viewed in FIG. 4). A reaction tube 240 (FIGS. 2 and 4) extends around the body portion 226 of the barbed fitting 220. Fluid pressure forces against the left (as viewed in FIG. 4) end of the head end portion 228 of the barbed fitting 220 are transmitted to the reaction tube 240. The reaction tube 240 has a right (as viewed in FIG. 4) end surface 244 which is pressed against the shoulder 246 on the handle portion 166 of the spray gun 64. Therefore, fluid pressure forces applied against the barbed fitting 220 are transmitted through the reaction tube 240 to the handle portion 166 of the spray gun 64 to retain the barbed fitting against movement relative to the extension portion 168 of the spray gun.

The coating material conduit 62 is relatively flexible. The reaction tube 240 is relatively stiff. Therefore, the reaction tube 240 is utilized to transmit forces from the barbed fitting 220 to the handle portion 166 of the spray gun 64. The reaction tube 240 holds the barbed fitting 220 in place in the extension portion 168 of the spray gun. The reaction tube 240 is formed of an electrically insulating polymeric material. For example, the reaction tube 240 may be formed of G10 phenolic tubing.

The outer layer 128 of abrasion-resistant material extends past the sleeve 200 (FIG. 3) and the end 180 of the electrically conducting third layer 126 of the coating material conduit 62. The outer layer 128 of the conduit extends around an arcuate bend 250 (FIG. 4) in the coating material conduit 62. The abrasion-resistant outer layer 128 extends into the reaction tube 240 to the end 182 of the outer layer. From the end 182 of the abrasion-resistant outer layer, an inner side surface of the reaction tube 240 engages an outer side surface (FIG. 3) of the electrically insulating second layer 124 of the coating material conduit 62. The inner layer 120 and the second layer 124 of the coating material conduit 62 extend to the head portion 228 of the barbed fitting 220.

When the coating material conduit 62 is to be inserted into the spray gun 64 (FIG. 4), a cover retaining screw 258 and an electrically conductive cover 260 are removed from the handle portion 166 of the spray gun. The leading end portion of the coating material conduit 62, which is surrounded by the reaction tube 240, is then inserted into the passage 230 which extends from the handle portion 166 of the spray gun 64 into the extension portion 168 of the spray gun. An O-ring seal 264 on the barbed fitting 220 engages the inner side surface of the passage 230 disposed in the extension or barrel portion 168 of the spray gun 64. The outer side surface of the reaction tube 240 may be coated with a dielectric grease to block any electrical discharge from the electrostatically charged liquid coating material to the electrically grounded handle portion 166 along the joint between the reaction tube 240 and the passage 230.

As the outlet end portion 138 of the coating material conduit 62 and the reaction tube 240 are inserted into the passage 230, the bend 250 is formed in the coating material conduit 62. The coating material conduit is pressed firmly into a channel 268 (FIG. 4) to position the coating material conduit 62 relative to the handle portion 166 of the spray gun 64. As this occurs, the key 208 on the stress relief structure 204 is pressed into the recess 210 in the handle portion 166 of the spray gun. Engagement of the key 208 with the recess 210 positions the stress relief structure 204 relative to the handle portion 166 of the spray gun. The cover 260 is then slid into place on the handle portion 166 of the spray gun 64.

The cover 260 has a pair of parallel linear grooves (not shown) which extend along opposite edge portions of the cover. The grooves are engaged by linear guides or tracks (not shown) on the handle portion 166 to guide movement of the cover into place on the handle portion and to retain the cover. As the cover is slid into place on the handle portion 166, the cover presses the stress relief structure 204 firmly into place in the handle portion. Once the cover 260 has been slid into place on the handle portion 166, the cover retaining screw 258 is inserted through the cover and engages an internally threaded fitting in the handle portion to lock the cover in place.

Once the cover 260 has been positioned on the handle portion 166, a retainer plate 274 (FIG. 6) is secured in place with a suitable retaining screw 276 to hold the stress relief structure 204 against movement relative to the handle portion 166 of the spray gun 64.

In one specific embodiment of the invention, the cover 260 and handle portion 166 were both formed of a composite electrically conductive material, specifically polypropylene containing sufficient carbon fibers to be electrically conductive. Of course, other electrically conductive, even metallic, materials could be utilized if desired. In this specific embodiment of the invention, the extension portion 168 of the spray gun 64 was formed of an electrically insulating material, specifically polypropylene. By using nonmetallic materials to form the handle portion 166, extension portion 168 and cover 260, the weight of the spray gun tends to be minimized. Of course, materials other than these specific materials could be utilized if desired. However, the handle portion 166 and cover 260 are preferably formed of an electrically. conductive material while the extension portion 168 is formed of an electrically insulating material.

Air Conduit

The air conduit 78 has an electrically insulating outer layer 282 (FIG. 6) which encloses an electrically conductive inner layer 284. By surrounding the electrically conductive inner layer 284 with the electrically insulating or nonconductive outer layer 282, the amount of insulation between the electrically grounded inner layer of the air conduit 26 and the closely adjacent coating material conduit 62 is increased. This tends to minimize even the remotest possibility of an electrical discharge occurring between the electrostatically charged liquid coating material in the conduit 62 and the electrically grounded inner layer 284 of the air conduit 78.

It is contemplated that the electrically nonconductive outer layer 282 and the electrically conductive inner layer 284 of the air conduit 78 could be formed of many different materials. It is contemplated that the outer layer 282 of the air conduit 78 will be formed of a urethane which is electrically nonconductive. It is contemplated that the inner layer 284 of the air conduit 78 will be formed of a polyvinyl chloride (PVC) containing sufficient carbon black to make the inner layer 284 electrically conductive. The outer and inner layers 284 and 282 of the air conduit 78 are firmly interconnected to form a unitary assembly.

An air conduit connector assembly 288 releasably interconnects the air conduit 78 and the handle portion 166 of the spray gun 64. The air connector assembly 288 is formed of an electrically conductive material. The air connector assembly 288 is effective to electrically interconnect the electrically conductive handle portion 166 of the spray gun 64 and the electrically grounded inner layer 284 of the air conduit 78. Therefore, the electrically conductive handle portion 166 of the spray gun 64 is electrically grounded through the air connector assembly 288 and the air conduit 26, as will be later described in more detail.

The air connector assembly 288 includes a socket assembly 292 and a plug assembly 294. The socket assembly 292 is connected with the air conduit 78. The plug assembly is connected with the handle portion 166 of the spray gun 64. If desired, the plug assembly 294 could be connected to the air conduit 78 and the socket assembly 292 could be connected to the handle portion 166 of the spray gun 64.

The socket assembly 292 includes a socket housing 298 in which the plug assembly 294 is telescopically received. A manually releasable latch slide 300 is slidably mounted on the socket housing 298. The slide 300 is manually movable between an engaged position interconnecting the plug assembly 294 and the socket housing 298 and a release position in which the slide is ineffective to retain the plug assembly 294 in the socket housing 298.

The socket housing 298 has a barbed end portion 304 which is telescopically received in the electrically conductive inner layer 284 of the air conduit 78. The barbed end portion 304 deforms and resiliently expands the inner layer 284 of the air conduit 78. This results in a solid electrical interconnection between the barbed end portion 304 of the socket housing 298 and the electrically conductive inner layer 284 of the air conduit 78. The inner layer 294 of the air conduit 78 is electrically grounded, through the control valve 76, air conduit 74 and air source 72 to the electrical ground 160 (FIG. 1). Therefore, the socket housing 298 is electrically grounded by the inner layer 284 of the air conduit 78.

Figure 6:
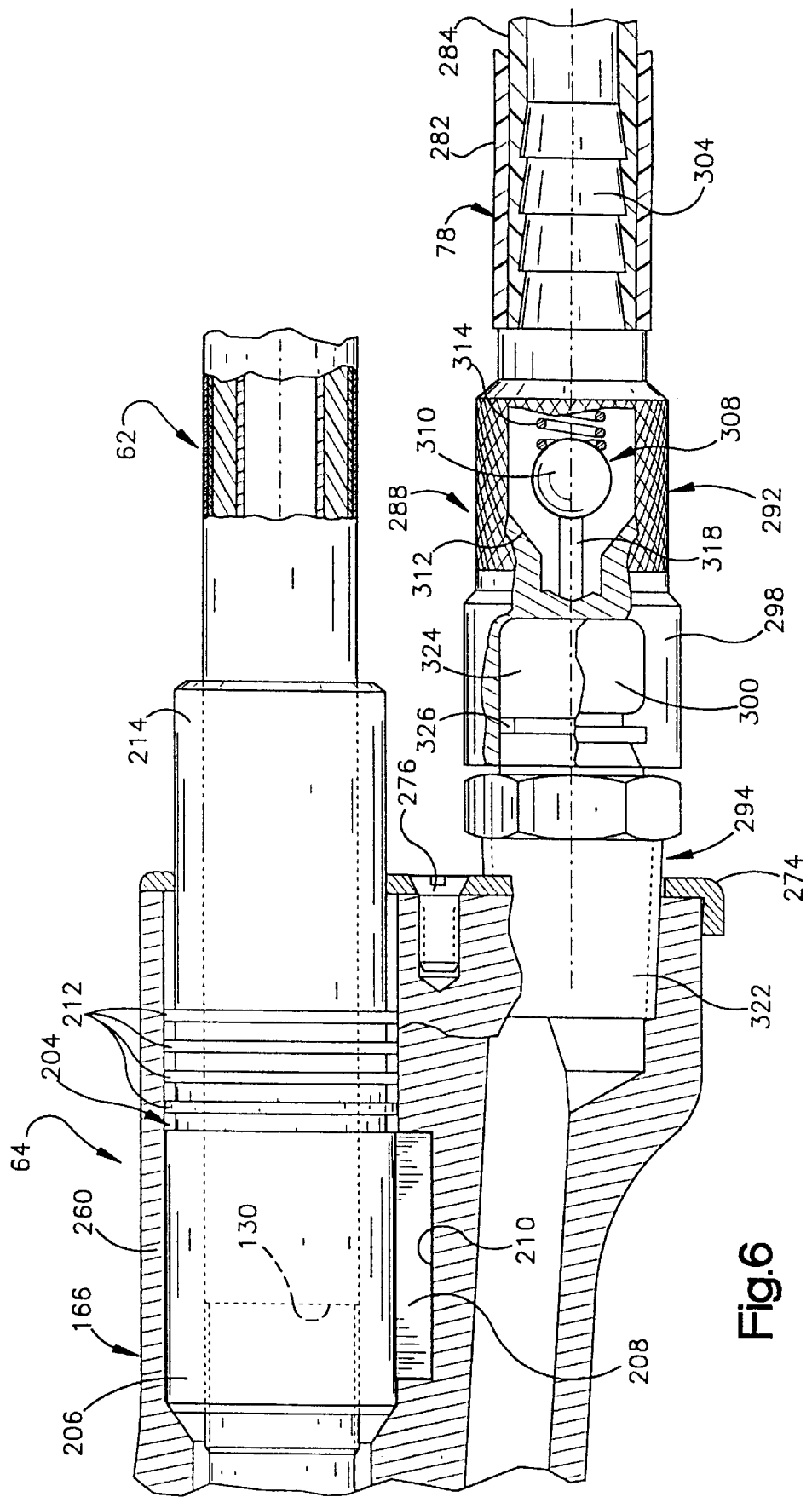
FIG. 6 is an enlarged fragmentary sectional view illustrating the manner in which the coating material conduit of FIG. 2 and an air conduit are connected with a handle portion of the spray gun of FIG. 4.

A shut-off valve assembly 308 is disposed within the socket housing 298 in the manner indicated schematically in FIG. 6. The shut-off valve assembly 308 includes a ball valve 310. The ball valve 310 is urged toward a conical valve seat 312 by a biasing spring 314.

When the socket assembly 292 is disconnected from the plug assembly 294, the biasing spring 314 presses the ball valve 310 against the valve seat 312 to block the flow of air from the conduit 78 through the socket assembly 292. The pressure of air against the ball valve 310 further presses the ball valve against the valve seat 312. The resulting fluid tight seal between the ball valve 310 and socket housing 298 blocks leakage of air from the conduit 78 when the conduit is disconnected from the spray gun 64.

Upon insertion of the plug assembly 294 into the socket assembly 292, a valve actuator member, indicated schematically at 318 in FIG. 6, is engaged by a leading end portion of the plug assembly 294 and moves the ball valve 310 away from the valve seat 312 to the open position shown in FIG. 6. Once the ball valve 310 has moved to the open position shown in FIG. 6, air can flow freely through the socket assembly 292 into the plug assembly 294.

The plug assembly 294 has a threaded end portion 322 which is connected with the handle portion 166 of the spray gun 64. The plug assembly 294 has a nose or outer end portion 324 which is received in the socket housing 298. An annular groove 326 in the plug assembly 294 is engaged by the slide 300 to retain the plug assembly 294 in the socket assembly 292. When the socket assembly 292 and plug assembly 294 are interconnected, the handle portion 166 of the spray gun 64 is electrically connected with the inner layer 284 of the air conduit 78 and with the electrical ground 160 (FIG. 1).

In one specific embodiment of the invention, the air connector assembly 288 was a quick disconnect coupling obtained from Colder Products Company, St. Paul, Minn. This particular embodiment of the air connector assembly 288 had a socket housing 298 and plug assembly 294 which were formed of brass which was chrome plated. Of course, other known quick disconnect tool removable coupling assemblies made of other materials which are electrically conductive could be utilized if desired.

The air flow from the conduit 78 is conducted through suitable passages in the handle portion 166 of the spray gun 64 to the main air flow control valve 172 (FIG. 4). The main air flow control valve 172 directs air flow to suitable passages formed in the handle portion 166 and extension portion 168 of the spray gun 64. The flow of air from the main air flow control valve is divided into a flow of atomizing air and pattern air which are conducted to the nozzle 194 to analyze the flow of electrostatically charged coating material at the nozzle 142 and to shape the flow atomized electrostatically charged coating material from the nozzle 142 in a known manner. It is believed that it will be particularly advantageous to have the pattern air flow and the atomizing air flow controlled in the manner disclosed in the aforementioned U.S. patent application Ser. No. 08/395,808 filed Feb. 28, 1995 by Ronald J. Hartle, the disclosure of which has been and hereby is incorporated herein in its entirety.

Coating Material Conduit—Second Embodiment

In the embodiment of the invention illustrated in FIGS. 1–6, the coating material conduit 62 has four layers, that is, the inner layer 120 formed of an electrically insulating polymeric material which is chemically nonreactive with the electrostatically charged coating material, a second layer 124 of electrically insulating material, a third layer 126 of electrically conductive material, a fourth or outer layer 128 of electrically insulating and abrasive-resistant material. It is contemplated that the coating material conduit 62 could be constructed with a greater or lesser number of layers if desired. For example, in the embodiment of the invention illustrated in FIG. 7, the coating material conduit has five layers. Since the embodiment of the invention illustrated in FIG. 7 is generally similar to the embodiment of the invention illustrated in FIGS. 1–6, similar numerals will be utilized to designate similar components, the suffix letter "a" being associated with the numerals of FIG. 6 to avoid confusion.

A coating material conduit 62a (FIG. 7) includes an inner layer 120a which defines a generally cylindrical passage 122a which extends through the coating material conduit 62a. The inner layer 120a is formed of an electrically insulating material which is chemically nonreactive with the electrostatically charged coating material which is conducted through the passage 122a.

In accordance with a feature of this embodiment of the invention, an electrically insulating reinforcing layer 350 is provided around the layer 120a. The reinforcing layer 350 may be formed of Kevlar (trademark). The reinforcing layer 350 reinforces the inner layer 120a. By having the reinforcing layer 350, electrostatically charged coating material can be conducted through the passage 122a at relatively high pressures.

A second layer 124a formed of an electrically insulating material extends around the reinforcing layer 350. The second layer 124a may be formed of an elastomeric material which is electrically insulating, such as synthetic rubber. An electrically conductive third layer 126a extends around the second layer 124a. The electrically conductive third layer 126a is also formed of an elastomeric material, such as synthetic rubber, which contains an electrically conductive material such as carbon, to make the third layer electrically conductive. An electrically insulating and abrasive-resistant outer layer 128a extends around the third layer 126a. A sleeve 200a engages an end 180a of the electrically insulating layer 126a. The outer layer 128a extends around the sleeve 200a.

The coating material conduit 62a has the same general construction as the coating material conduit 62 (FIG. 2). The coating material conduit 62a is connected with a spray gun in the same manner in which the coating material conduit 62 is connected with the spray gun 64 (FIG. 4). Although it is preferred to connect the coating material conduits 62 and 62*a* with a spray gun 64 having the construction illustrated in FIG. 4, the coating material conduits 62 and 62*a* could be connected in many different ways with spray guns having many different constructions.

Conclusion

The present invention relates to a new and improved apparatus 10 for use in applying electrostatically charged coating material to a workpiece. The apparatus includes an improved coating material conduit 62 which is flexible and conducts electrostatically charged coating material to the light weight spray gun 64. The coating material conduit 62 may include a plurality of flexible layers 120, 124, 126 and 128.

A first or inner layer 120 of the coating material conduit 62 may be formed of a material which is electrically insulating and is chemically nonreactive with the electrostatically charged coating material. A second layer 124 of elastomeric material, which may be synthetic rubber, is disposed around the first layer 120 and is electrically insulating. A third layer 126 of elastomeric material, which may also be synthetic rubber, extends around the second layer 124 and contains electrically conductive material so that the third layer is electrically conductive. A fourth or outer layer 128 extends around the third layer 126 and is formed of material which is abrasion resistant.

To promote flexibility of the coating material conduit 62, the second layer 124, which is electrically insulating, may have a Shore A hardness of 75 or less. The electrically insulating second layer may have a thickness which is at least 0.200 times an overall radial extent of the coating material conduit 62.

The coating material conduit 62 may advantageously be connected with a voltage block 30. The voltage block 30 is effective to isolate an apparatus 54, 68 which electrostatically charges the coating material from a source 12 of coating material which is not electrostatically charged. The voltage block 30 and the apparatus 54, 68 for electrostatically charging the coating material may be enclosed in an electrically grounded cabinet 86. The electrically conductive third layer 126 of the coating material conduit 62 may be connected with an electrical ground through the cabinet.

The coating material conduit 62 may extend through an electrically conductive handle portion 166 of the spray gun 64 into an electrically insulating extension portion 168 of the spray gun. An electrode 184 in the extension portion 168 of the spray gun 64 may be electrostatically charged by the coating material. The electrically conductive handle portion 166 of the spray gun 64 may be connected with an electrical ground by a conductor 284 which extends through a hose 78 which conducts air to the spray gun.

Having described the invention, the following is claimed:

1. An apparatus for use in applying electrostatically charged coating material to a workpiece, said apparatus comprising a spray gun, a source of electrostatically charged coating material, and a conduit which is connected with said spray gun and with said source of electrostatically charged coating material, said conduit including a first layer of a polymeric material, a second layer of elastomeric material disposed around said first layer, said second layer of elastomeric material being electrically insulating, a third layer of elastomeric material containing an electrically conductive material and disposed around said second layer, said third layer of elastomeric material and conductive material being electrically conductive, and a fourth layer of polymeric material extending around said third layer of elastomeric material, wherein said spray gun includes a handle portion, an extension portion connected to and extending outward from said handle portion, and a nozzle connected with said extension portion to direct a flow of electrostatically charged coating material toward a workpiece, said conduit having an end portion which extends into said extension portion of said spray gun, said end portion of said conduit including said first layer of a polymeric material and said second layer of elastomeric material which is electrically insulating, said third layer of elastomeric material containing an electrically conductive material having terminated prior to said end portion of said conduit and being spaced from said extension portion of said spray gun.

2. An apparatus as set forth in claim 1 wherein said second layer of an elastomeric material which is electrically insulating has a thickness which is greater than the combined thickness of said first layer of polymeric material, said third layer of elastomeric material containing an electrically conductive material and said fourth layer of polymeric material.

3. An apparatus as set forth in claim 1 wherein said flexible conduit includes an end portion formed by said first layer of polymeric material and said second layer of elastomeric material which is electrically insulating, said third layer of elastomeric material containing an electrically conductive material and said fourth layer of polymeric material being terminated prior to said end portion of said flexible conduit, said spray gun having a barrel portion from which a spray of electrostatically charged coating material is directed toward the workpiece and into which said end portion of said conduit extends.

4. An apparatus as set forth in claim 3 further including a seal fitting disposed in said barrel portion of said spray gun and formed of an electrically insulating material and extending into said end portion of said flexible conduit, said seal fitting having protrusions which engage said first layer of polymeric material to form a seal between said seal fitting and said first layer of polymeric material.

5. An apparatus as set forth in claim 1 further including a cabinet which at least partially encloses said source of electrostatically charged coating material and an electrical conductor interconnecting said cabinet and said third layer of elastomeric material containing an electrically conductive material.

6. An apparatus as set forth in claim 1 further including a layer of reinforcing material disposed between said first layer of polymeric material and said second layer of elastomeric material which is electrically insulating, said layer of reinforcing material cooperating with said first layer of polymeric material to withstand fluid pressures in the flow of coating material.

7. An apparatus as set forth in claim 1 wherein said spray gun includes a handle portion which is electrically grounded, an extension portion connected to and extending outward from said handle portion, said extension portion being formed of a material which is electrically nonconductive, a nozzle connected with said extension portion to direct a flow of electrostatically charged coating material toward the workpiece, said conduit having an end portion which extends into said extension portion of said spray gun, said end portion of said conduit includes said first layer of a polymeric material and said second layer of elastomeric material which is electrically insulating, said third layer of elastomeric material containing an electrically conductive material being terminated prior to said end portion of said conduit and being spaced from said extension portion of said spray gun.

8. An apparatus as set forth in claim 7 further including a tube of electrically insulating material extending around at least a portion of said end portion of said conduit, said tube of electrically insulating material having a rigidity which is greater than a rigidity of said second layer of elastomeric material which is electrically insulating, said tube of electrically insulating material extends from said extension portion of said spray gun to said handle portion of said spray gun to transmit fluid pressure forces from said extension portion of said spray gun to said handle portion of said spray gun.

9. An apparatus as set forth in claim 8 further including a seal member connected with said end portion of said conduit and said tube of electrically insulating material, said seal member cooperating with said extension portion of said spray gun to at least partially define a chamber for receiving electrostatically charged coating material, said seal member being effective to transmit fluid pressure forces from the chamber to said tube of electrically insulating material.

10. An apparatus as set forth in claim 1 wherein said spray gun has a handle portion which is electrically conductive, said apparatus further including an air conduit having a passage through which air is conducted to said spray gun, said air conduit including a conductor element formed of an electrically conductive material and connected with an electrical ground, said air conduit further including an insulating layer formed of an electrically insulating material, said passage in said air conduit through which air is conducted to said spray gun and said conductor element being at least partially enclosed by said insulating layer of said air conduit, an air conduit connector assembly which interconnects said air conduit and said handle portion of said spray gun, said air conduit connector assembly includes a portion which is formed of a material which is electrically conductive, said portion of said air conduit connector assembly which is electrically conductive being connected with said conductor element of said air conduit and with said handle portion of said spray gun.

11. An apparatus as set forth in claim 1 wherein said source of electrostatically charged coating material includes a source of coating material, charging apparatus which is operable to electrostatically charge coating material received from said source of coating material, and a voltage block disposed between said charging apparatus and said source of coating material, said voltage block being operable between a first condition in which said voltage block is effective to conduct coating material from said source of coating material to said charging apparatus and a second condition in which said voltage block is ineffective to conduct coating material from said source of coating material to said charging apparatus, said charging apparatus being electrically isolated from said source of coating material when said voltage block is in the second condition.

12. An apparatus as set forth in claim 11 wherein said voltage block and at least a portion of said charging apparatus are disposed within a housing which is connected with an electrical ground, said third layer of elastomeric material containing an electrically conductive material being connected with said housing in such a manner as to electrically ground said third layer of elastomeric material through said housing.

13. An apparatus as set forth in claim 1 wherein said second layer of elastomeric material which is electrically insulating and has a Shore A hardness of 75 or less.

14. An apparatus as set forth in claim 1 wherein said second layer of elastomeric material which is electrically insulating has a thickness which is at least 0.200 times an overall radial extent of said conduit.

15. An apparatus for use in applying electrostatically charged coated material to a workpiece, said apparatus comprising a spray gun from which a flow of electrostatically charged coating material is directed toward a workpiece, a source of electrostatically charged coating material, and a coating material conduit connected with said spray gun and said source of electrostatically charged coating material, said coating material conduit including an electrical conductor element which extends from said spray gun and is connected with an electrical ground adjacent to said source of electrostatically charged coating material, wherein said spray gun has an electrically conductive handle portion and an electrically insulating extension portion from which the flow of electrostatically charged coating material is directed toward the workpiece, said coating material conduit extends through said handle portion into said extension portion of said spray gun, said electrical conductor element extends into said handle portion of said spray gun to a location spaced from said extension portion of said spray gun, said electrical conductor element having an end which is disposed in said handle portion of said spray gun at the location which is spaced from the extension portion of said spray gun.

16. An apparatus as set forth in claim 15 wherein said coating material conduit includes an inner layer which at least partially defines a passage through which electrostatically charged coating material is conducted and an outer layer which extends around said inner layer, said electrical conductor element includes an electrically conductive layer which extends around said inner layer and is disposed between said inner and outer layers.

17. An apparatus as set forth in claim 15 further including an air conduit connected with a source of air under pressure and with said spray gun, said air conduit including a second electrical conductor element which is connected with an electrical ground adjacent to the source of air under pressure and which is electrically connected with said spray gun to electrically ground said spray gun.

18. An apparatus as set forth in claim 15 further including a voltage block connected with said coating material conduit, said voltage block being operable between a first condition in which said voltage block is effective to conduct coating material and a second condition in which said voltage block is ineffective to conduct coating material and in which said voltage block is effective to block transmission of electrical current through coating material at said voltage block.

19. An apparatus as set forth in claim 15 wherein said coating material conduit includes a passage through which electrostatically charged coating material is conducted to said spray gun and an electrically insulating layer disposed around said passage through which electrostatically charged coating material is conducted, said electrical conductor element includes an electrically conductive layer disposed around said electrically insulating layer.

20. An apparatus as set forth in claim 19 wherein said electrically insulating layer has a Shore A hardness of 75 or less.

21. An apparatus as set forth in claim 20 wherein said electrically insulating layer has a thickness which is at least 0.200 times an overall radial extent of said coating material conduit.

22. An apparatus as set forth in claim 15 wherein said spray gun has a handle portion which is manually engageable by an operator and an extension portion from which the flow of electrostatically charged coating material is directed toward the workpiece, said coating material conduit includes a first layer which at least partially defines a passage through which the electrostatically charged coating material is conducted, said first layer being formed of a first electrically insulating material which is chemically nonreactive with the electrostatically charged coating material, a second layer of an electrically insulating material, a third layer of an electrically conductive material, and a fourth layer of abrasion resistant material, said first and second layers of said coating material conduit extending through said handle portion of said spray gun into said extension portion of said spray gun, said third layer of said coating material conduit extending into said handle portion of said spray gun and having an end which is disposed in said handle portion of said spray gun at a location spaced from said extension portion of said spray gun.

23. An apparatus as set forth in claim 22 wherein said second layer of said coating material conduit is formed of synthetic rubber and said third layer of said coating material conduit is formed of synthetic rubber containing an electrically conductive material.

24. An apparatus as set forth in claim 22 wherein said fourth layer of an abrasion resistant material extends past the end of said third layer and is disposed in engagement with said second layer of said coating material conduit.

25. An apparatus as set forth in claim 15 wherein said coating material conduit includes a first layer of material which is chemically nonreactive with the electrostatically charged coating material, a second layer of an elastomeric material which is disposed around said first layer, said second layer of an elastomeric material being electrically insulating, and a third layer of an abrasion resistant material which extends around said second layer, said conductor element being formed by a layer of elastomeric material which is disposed between said second and third layers and which contains an electrically conductive material.

26. An apparatus for use in applying electrostatically charged coating material to a workpiece, said apparatus comprising a spray gun and conduit means for conducting a flow of electrostatically charged coating material to said spray gun, said conduit means including an inner layer which at least partially defines a passage through which the flow of electrostatically charged coating material is conducted, said inner layer being formed of a material which is electrically insulating and chemically nonreactive with the electrostatically charged coating material, an electrically insulating layer having a Shore A hardness of 75 or less which extends around said inner layer, an electrically conducting layer which extends around said electrically insulating layer and is formed of an electrically conductive material dispersed within an elastomeric material, and an outer layer which extends around said electrically conducting layer and is formed of an abrasion resistant material.

27. An apparatus as set forth in claim 26, wherein said electrically insulating layer is formed of an elastomeric material.

28. An apparatus as set forth in claim 26 further including a voltage block connected with said conduit means, said voltage block being operable between a first condition in which said voltage block is effective to conduct coating material and a second condition in which said voltage block is ineffective to conduct coating material and in which said voltage block is effective to block transmission of electrical current through coating material at said voltage block, and a housing which at least partially encloses said voltage block, said electrically conducting layer of said conduit means being connected with an electrical ground through said housing.

29. An apparatus as set forth in claim 26 wherein said electrically conducting layer is formed of synthetic rubber containing carbon.

30. An apparatus as set forth in claim 26 wherein said spray gun has a handle portion which is engageable by an operator and an extension portion having a nozzle from which the flow of electrostatically charged coating material is directed toward the workpiece, said conduit means extends into said handle portion of said spray gun and is connected in fluid communication with said nozzle by a passage formed in said extension portion of said spray gun.

31. An apparatus as set forth in claim 30 wherein said electrically conducting layer of said conduit means has an end which is disposed in said handle portion of said spray gun and is spaced from said extension portion of said spray gun, said inner and outer layers of said conduit means extend beyond said end of said electrically conducting layer.

32. An apparatus as set forth in claim 26 further including an electrically insulating layer disposed between said inner layer and said electrically conducting layer, said electrically insulating layer being formed of an elastomeric material having a Shore A hardness of 75 or less, said electrically insulating layer formed of an elastomeric material has a thickness which is at least 0.200 times an overall radial extent of said conduit means.

33. An apparatus for use in conducting electrostatically charged coating material to a spray gun, said apparatus comprising a flexible conduit having a first layer formed of a polymeric material, said first layer of polymeric material being electrically insulating and chemically nonreactive with the electrostatically charged coating material, a second layer of elastomeric material disposed around said first layer, said second layer of elastomeric material being electrically insulating and having a Shore A hardness of 75 or less, a third layer of elastomeric material containing an electrically conductive material and disposed around said second layer, said third layer of elastomeric material and conductive material being electrically conductive, and a fourth layer of polymeric material extending around said third layer of elastomeric material, said fourth layer of polymeric material being abrasion resistant and electrically insulating.

34. An apparatus as set forth in claim 33 wherein said first layer of polymeric material and said second layer of elastomeric material which is electrically insulating extend beyond an end of said third layer of elastomeric material which is electrically conductive, said fourth layer of polymeric material which is abrasion resistant having a portion which extends beyond the end of said third layer of elastomeric material which is electrically conductive, said portion of said fourth layer of polymeric material which is abrasion resistant and extends beyond the end of said third layer of elastomeric material which is electrically conductive extends around and is sealingly connected with said second layer of synthetic rubber which is electrically insulating.

35. An apparatus as set forth in claim 33 further including a tubular member having a first end portion disposed in engagement with the end of said third layer of elastomeric material which is electrically conductive, said fourth layer of polymeric material which is abrasion resistant extends beyond a second end of said tubular member to a location where said fourth layer of polymeric material which is abrasion resistant is sealingly connected with said second layer of elastomeric material which is electrically insulating.

36. An apparatus as set forth in claim 33 wherein the electrically conductive material in said third layer of elastomeric material is carbon.

37. An apparatus as set forth in claim 33 wherein said second layer of elastomeric material which is electrically insulating has a thickness which is at least 0.200 times an overall radial extent of said conduit.

38. An apparatus for use with a spray gun to apply electrostatically charged coating material to a workpiece, said apparatus comprising a source of coating material, a voltage block connected in fluid communication with said source of coating material, a charging apparatus connected in fluid communication with said voltage block and operable to electrostatically charge coating material conducted from the source of coating material through said voltage block to said charging apparatus, and a coating material conduit connected in fluid communication with said charging apparatus to conduct electrostatically charged coating material to the spray gun, said coating material conduit including an electrical conductor element connected with an electrical ground, said electrical conductor element extends from a location adjacent to said charging apparatus to an end portion of said coating material conduit which is adapted to be connected with the spray gun, wherein said coating material conduit includes an inner layer which is electrically insulating and is exposed to a flow of electrostatically charged coating material, an electrically insulating layer having a Shore A hardness of 75 or less which extends around said inner layer, and an outer layer formed of an abrasion resistant material, said electrical conductor element includes an electrically conducting layer disposed between said electrically insulating layer and said outer layer, said electrically conducting layer being formed of an elastomeric material containing electrically conductive material.

39. An apparatus as set forth in claim 38 further including connector means for connecting an end portion of said coating material conduit in fluid communication with said charging apparatus, said electrical conductor element being spaced from said connector means.

40. An apparatus as set forth in claim 38 further including a housing at least partially enclosing said charging apparatus and connected with an electrical ground, said electrical conductor element being connected with the electrical ground through said housing.

41. An apparatus as set forth in claim 38 wherein said voltage block is operable between a first condition in which said voltage block is effective to conduct coating material and a second condition in which said voltage block is ineffective to conduct coating material and in which said voltage block is effective to block transmission of electrical current through coating material at said voltage block.

42. An apparatus for use in applying electrostatically charged coating material to a workpiece, said apparatus comprising a spray gun having an electrically conductive handle portion engageable by an operator and an extension portion which directs a flow of electrostatically charged coating material toward the workpiece, an air conduit to conduct a flow of air to said handle portion of said spray gun, a coating material conduit to conduct a flow of electrostatically charged coating material to said spray gun, said coating material conduit extends through said handle portion of said spray gun into said extension portion of said spray gun, and electrode means for receiving an electrical charge from the electrostatically charged coating material and strengthening an electrostatic field between said spray gun and the workpiece during application of electrostatically charged coating material to the workpiece.

43. An apparatus as set forth in claim 42 wherein said electrode means is movable between a closed position in which said electrode means is effective to block a flow of electrostatically charged coating material from said spray gun and an open position in which said electrode means enables a flow of the electrostatically charged coating material to be directed from said extension portion of said spray gun toward the workpiece, said spray gun further including means for moving said electrode means from the closed position to the open position.

44. An apparatus as set forth in claim 42 further including an electrical conductor connected with said handle portion of said spray gun and an electrical ground to electrically ground said handle portion of said spray gun.

45. An apparatus as set forth in claim 44 further including means for maintaining said electrode means electrically isolated from electrical ground during application of coating material to the workpiece.

46. An apparatus as set forth in claim 42 wherein said air conduit includes an electrical conductor connected with an electrical ground and with said handle portion of said spray gun to electrically ground said handle portion of said spray gun.

47. An apparatus as set forth in claim 42 wherein said coating material conduit includes an inner layer which at least partially defines a passage through which electrostatically charged coating material is conducted, an outer layer which extends around said inner layer, and an electrically conductive layer which extends around said inner layer and is disposed between said inner and outer layers.

48. An apparatus as set forth in claim 42 wherein said air conduit includes an electrical conductor element which is connected with an electrical ground adjacent to a source of air under pressure and which is electrically connected with said spray gun to electrically ground said spray gun.

49. An apparatus as set forth in claim 42 further including a voltage block connected with said coating material conduit, said voltage block being operable between a first condition in which said voltage block is effective to conduct coating material and a second condition in which said voltage block is ineffective to conduct coating material and in which said voltage block is effective to block transmission of electrical current through coating material at said voltage block.

50. An apparatus as set forth in claim 42 wherein said coating material conduit includes a passage through which electrostatically charged coating material is conducted to said spray gun, an electrically insulating layer formed of synthetic rubber and disposed around said passage through which electrostatically charged coating material is conducted, and an electrically conductive layer formed of synthetic rubber containing an electrically conductive material and disposed around said electrically insulating layer of synthetic rubber.

51. An apparatus as set forth in claim 42 wherein said coating material conduit includes a first layer which at least partially defines a passage through which the electrostatically charged coating material is conducted, said first layer being formed of a first electrically insulating material which is chemically nonreactive with the electrostatically charged coating material, a second layer of an electrically insulating material, a third layer of an electrically conductive material, and a fourth layer of abrasion resistant material, said first and second layers of said coating material conduit extending through said handle portion of said spray gun into said extension portion of said spray gun, said third layer of said coating material conduit extending into said handle portion of said spray gun and having an end which is disposed in said handle portion of said spray gun at a location spaced from said extension portion of said spray gun.

52. An apparatus as set forth in claim 51 wherein said second layer of said coating material conduit is formed of synthetic rubber and said third layer of said coating material conduit is formed of synthetic rubber containing an electrically conductive material.

53. An apparatus as set forth in claim 51 wherein said fourth layer of an abrasion resistant material extends past the end of said third layer and is disposed in engagement with said second layer of said coating material conduit.

54. An apparatus as set forth in claim 42 wherein said coating material conduit includes a first layer of material which is chemically nonreactive with the electrostatically charged coating material, a second layer of an elastomeric material which is disposed around said first layer, said second layer of an elastomeric material being electrically insulating, a third layer of an abrasion resistant material which extends around said second layer, and a layer of elastomeric material which is disposed between said second and third layers and which contains an electrically conductive material.

55. An apparatus as set forth in claim 54 wherein said first and second layers extend from said handle portion of said spray gun into said extension portion of said spray gun.

56. An apparatus as set forth in claim 54 wherein said second layer of an elastomeric material which is electrically insulating has a Shore A hardness of 75 or less and a thickness which is at least 0.200 times an overall radial extent of said conduit.

57. A flexible hose for carrying coating material to an electrostatic coating applicator, the hose having a circular cross-section and a radius "r" from the center of the cross section to the outside diameter of the hose wall, the hose wall including an electrically insulative layer comprised of a material having a Shore A hardness of 75 or less for at least a wall thickness of 0.20 r, an inner layer in contact with the paint being constructed from high density polyethylene or any polyolefin and an outer conductive layer, said insulative layer being located between said outer conductive layer and said inner layer.

58. The hose of claim 57 wherein said insulative layer is adhered to said inner layer.

59. The hose of claim 57 further including an abrasion resistant layer surrounding said outer conductive layer.

60. The hose of claim 57 wherein said insulative layer is synthetic rubber.

61. The hose of claim 57 wherein said outer conductive layer includes both synthetic rubber and a conductive material.

62. The hose of claim 57 wherein the Shore A hardness is 50 or less.

* * * * *